United States Patent
Bredt et al.

(10) Patent No.: US 6,610,429 B2
(45) Date of Patent: Aug. 26, 2003

(54) THREE DIMENSIONAL PRINTING MATERIAL SYSTEM AND METHOD

(75) Inventors: James F. Bredt, Watertown, MA (US); Timothy C. Anderson, Cambridge, MA (US); David B. Russell, Southboro, MA (US)

(73) Assignee: Z Corporation, Burlington, MA (US)

( * ) Notice: Subject to any disclaimer, the term of this patent is extended or adjusted under 35 U.S.C. 154(b) by 0 days.

(21) Appl. No.: 09/832,309

(22) Filed: Apr. 10, 2001

(65) Prior Publication Data

US 2002/0026982 A1 Mar. 7, 2002

Related U.S. Application Data

(63) Continuation of application No. 09/182,295, filed on Oct. 29, 1998, now abandoned, which is a continuation-in-part of application No. 08/707,693, filed on Sep. 4, 1996, now Pat. No. 5,902,441.

(51) Int. Cl.[7] .............................................. B32B 31/00
(52) U.S. Cl. ..................... 428/703; 156/39; 156/284; 264/113; 264/308; 264/333
(58) Field of Search ................................. 264/109, 113, 264/308, 333; 156/39, 284; 428/703

(56) References Cited

U.S. PATENT DOCUMENTS

| | | | |
|---|---|---|---|
| 3,870,538 A | * | 3/1975 | Burkard et al. |
| 4,247,508 A | | 1/1981 | Housholder |
| 4,369,025 A | | 1/1983 | von der Weid |
| 4,575,330 A | | 3/1986 | Hull |
| 4,613,627 A | | 9/1986 | Sherman et al. |
| 4,618,390 A | | 10/1986 | Powell |
| 4,863,538 A | | 9/1989 | Deckard |
| 4,938,816 A | | 7/1990 | Beaman et al. |
| 4,942,003 A | | 7/1990 | Bold |

(List continued on next page.)

FOREIGN PATENT DOCUMENTS

| | | |
|---|---|---|
| DE | 40 12 044 A1 | 10/1991 |
| EP | 0 431 924 A2 | 6/1991 |
| WO | WO 93/25336 A1 | 12/1993 |
| WO | WO 94/12328 A1 | 6/1994 |
| WO | WO 95/30503 A1 | 11/1995 |
| WO | WO 97/11835 A2 | 4/1997 |
| WO | WO 97/26302 A1 | 7/1997 |
| WO | WO 98/09798 A1 | 3/1998 |
| WO | WO 98/28124 A2 | 7/1998 |

OTHER PUBLICATIONS

Khanuja, S.S.; "Origin and Control of Anisotrophy in Three Dimensional Printing of Structural Ceramics", (Doctoral Thesis), Massachusetts Institute of Technology, Feb. 1996.

Borland, S.W.; "Characterization of Fundamental and Reticulated Biomedical Polymer Structures Fabricated by Three Dimensional Printing", (Doctoral Thesis), Massachusetts Institute of Technology, Jun. 1995.

Patent Abstracts of Federal Republic of Germany, DE 4012044 A, Oct. 17, 1991.

Patent Abstracts of Japan, vol. 1999, No. 9, Jul. 30, 1999 & JP 11 116875 A (Teikoku Ink Seizo KK), Apr. 27, 1999.

Patent Abstracts of Japan, vol. 1995, No. 01, Feb. 28, 1995 & JP 06 289612 A (Nippon Zeon Co Ltd), Oct. 18, 1994.

*Primary Examiner*—Steven D. Maki
(74) *Attorney, Agent, or Firm*—Lowrie, Lando & Anastasi, LLP

(57) ABSTRACT

The present invention is directed to a 3DP™ material system ad method, and an article made therefrom. The method of the present invention includes building cross-sectional portions of a three-dimensional article, and assembling the individual cross-sectional areas in a layer-wise fashion to form a final article. The individual cross-sectional areas are built by using an ink-jet printhead to deliver an aqueous fluid to a particulate material that includes plaster.

30 Claims, 3 Drawing Sheets

U.S. PATENT DOCUMENTS

| | | |
|---|---|---|
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,127,037 A | 6/1992 | Bynum |
| 5,132,143 A | 7/1992 | Deckard |
| 5,147,587 A | 9/1992 | Marcus et al. |
| 5,155,321 A | 10/1992 | Grube et al. |
| 5,155,324 A | 10/1992 | Deckard et al. |
| 5,204,055 A | 4/1993 | Sachs et al. |
| 5,252,264 A | 10/1993 | Forderhase et al. |
| 5,296,062 A | 3/1994 | Bourell et al. |
| 5,316,580 A | 5/1994 | Deckard |
| 5,340,656 A | 8/1994 | Sachs et al. |
| 5,342,566 A | 8/1994 | Schäfer et al. |
| 5,342,919 A | 8/1994 | Dickens, Jr. et al. |
| 5,352,405 A | 10/1994 | Beaman et al. |
| 5,376,320 A | 12/1994 | Tiefenbacher et al. |
| 5,382,308 A | 1/1995 | Bourell et al. |
| 5,387,380 A | 2/1995 | Cima et al. |
| 5,429,788 A | 7/1995 | Ribble et al. |
| 5,490,962 A | 2/1996 | Cima et al. |
| 5,506,046 A | 4/1996 | Andersen et al. |
| 5,518,680 A | 5/1996 | Cima et al. |
| 5,632,848 A | 5/1997 | Richards et al. |
| 5,639,402 A | 6/1997 | Barlow et al. |
| 5,656,230 A | 8/1997 | Khoshevis |
| 5,660,900 A | 8/1997 | Andersen et al. |
| 5,684,713 A | 11/1997 | Asada et al. |
| 5,783,358 A | 7/1998 | Schulthess et al. |
| 5,851,465 A | 12/1998 | Bredt |
| 5,902,441 A | 5/1999 | Bredt et al. |
| 5,943,235 A | 8/1999 | Earl et al. |

\* cited by examiner

THREE DIMENSIONAL PRINTING MATERIAL SYSTEM AND METHOD

This application is a continuation of U.S. patent application Ser. No. 09/182,295, filed Oct. 29, 1998 now abandoned, which is a continuation-in-part of U.S. patent application Ser. No. 08/707,693, filed Sep. 4, 1996, now U.S. Pat. No. 5,902,441.

BACKGROUND

1.0 Field of the Invention

This invention relates generally to rapid prototyping techniques, and more particularly to plaster-based Three Dimensional Printing materials and methods.

2.0 Related Art

The field of rapid prototyping involves the production of prototype articles and functional parts, as well as ceramic shell molds for metal casting, directly from computer-generated design data.

Two well-known methods for rapid prototyping include a selective laser sintering process and a liquid binder Three Dimensional Printing process (3DP™, trademark of Massachusetts Institute of Technology, Cambridge, Mass.). The techniques are similar to the extent that they both use layering techniques to build three-dimensional articles. Both methods form successive thin cross sections of the desired article. The individual cross sections are formed by bonding together grains of a granular material on a flat surface of a bed of the granular material. Each layer is bonded to a previously formed layer to form the desired three-dimensional article at the same time as the grains of each layer are bonded together. The laser-sintering and liquid binder techniques are advantageous because they create parts directly from computer-generated design data and can produce parts having complex geometries. Moreover, 3DP™ methods can be quicker and less expensive than conventional machining of prototype parts or production of cast or molded parts by conventional "hard" or "soft" tooling techniques which can take from a few weeks to several months, depending on the complexity of the item.

3DP™ methods have been used to make ceramic molds for investment casting, thereby generating fully-functional metal parts. Additional uses have been contemplated for 3DP™ methods.

For example, 3DP™ methods may be useful in design-related fields where the articles may be used for visualization, demonstration and mechanical prototyping. It may also be useful for making patterns for molding processes. 3DP™ methods may be further useful, for example, in the fields of medicine and dentistry, where expected outcomes may be modeled prior to performing procedures. Other businesses that could benefit from rapid prototyping technology include architectural firms, as well as others in which visualization of a design is useful.

A selective laser sintering process is described in U.S. Pat. No. 4,863,568, which is incorporated herein by reference. The selective laser sintering process was commercialized by DTM Corporation. The selective laser sintering process involves spreading a thin layer of powder onto a flat surface. The powder is spread using a tool developed for use with the selective laser sintering process, known in the art as a counter-rolling mechanism (hereinafter "counter-roller"). Using the counter-roller allows thin layers of material to be spread evenly, without disturbing previous layers. After the layer of powder is spread onto the surface, a laser is used to direct laser energy onto the powder in a predetermined two-dimensional pattern. The laser sinters or fuses the powder together in the areas struck by its energy. The powder can be plastic, metal, polymer, ceramic or a composite. Successive layers of powder are spread over previous layers using the counter-roller, followed by sintering or fusing with the laser. The process is essentially thermal, requiring delivery by the laser of a sufficient amount of energy to sinter the powder together, and to previous layers, to form the final article.

The selective laser sintering process is expensive due to the high cost of the laser and the complexity of the equipment used. In addition, only one laser is used at a time, making it a slow method. In addition, depending on the application, materials are sometimes used in the selective laser sintering method that require special handling or processing facilities.

U.S. Pat. No. 5,204,055, incorporated herein by reference, describes an early 3DP™ method which involves the use of an ink-jet printing head to deliver a liquid or colloidal binder material to layers of powdered material. The technique (hereafter "liquid binder method") involves applying a layer of a powdered material to a surface using a counter-roller. After the powdered material is applied to the surface, the ink-jet printhead delivers a liquid binder to the layer of powder. The binder infiltrates into gaps in the powder material, hardening to bond the powder material into a solidified layer. The hardened binder also bonds each layer to the previous layer. After the first cross-sectional portion is formed, the previous steps are repeated, building successive cross-sectional portions until the final article is formed. Optionally, the binder can be suspended in a carrier which evaporates, leaving the hardened binder behind. The powdered material can be ceramic, metal, plastic or a composite material, and can also include fiber. The liquid binder material can be organic or inorganic. Typical organic binder materials are polymeric resins, or ceramic precursors such as polycarbosilazone. Inorganic binders are used where the binder is incorporated into the final articles; silica is typically used in such an application.

One advantage of using an ink-jet print head rather than a laser is that inexpensive printheads are commercially available that have a plurality of spray nozzles used to deliver binder to the powder that are arranged side-by-side in a single print head. In selective laser sintering machines, only one laser, which delivers energy to the powder, is conventionally used. The combination of several spray nozzles increases the speed of liquid binder printing compared to laser-sintering by allowing a wider area to be printed at one time. In addition, the liquid binder printing equipment is much less expensive than the laser equipment due to the high cost of the laser and the high cost of the related beam deflection optics and controls.

However, the liquid binder printing technique has a serious reliability problem associated with the spray nozzles becoming clogged with the binder and/or powder material. Clogging occurs when binders having high levels of suspended solids are used. The problem with clogging requires frequent interruptions of the build in order to clean the spray nozzle. The clogging problem increases the time and labor required to build parts and to maintain the equipment. Therefore, although the liquid binder printing technique represents an advance in speed and cost over the selective laser sintering process, it suffers from reliability problems that slow down the build rate, increasing labor and equipment maintenance costs. This problem interferes with the potential speed advantage of increased printing capability presented by the plurality of spray nozzles.

In addition to the above-mentioned disadvantages, the powders, especially metallic powders, used in both selective laser sintering and liquid binder techniques present safety issues that render them undesirable for use in an office environment. These safety issues may require special clothing and processing facilities to prevent, for example, skin contact or inhalation of toxic materials. In addition, more expense may be incurred through complying with regulations for the disposal of toxic materials. For these reasons, these techniques do not lend themselves to being used in typical office environments, such as architectural and design firms, or doctors' offices.

U.S. Pat. No. 5,490,962 to Cima discloses solid free-form techniques for making medical devices for controlled release of bioactive agents.

U.S. Pat. No. 5,639,402, to Barlow discloses a method for selectively fusing calcium phosphate particles that are coated, or alternatively mixed with, a polymeric binder material.

SUMMARY

The present invention is directed to a materials system and method that satisfies the need for a quick, reliable, safe, and inexpensive method for producing both appearance models and small numbers of functional parts in an office environment. The invention is based on the discovery that rapid prototyping can be carried out using plaster.

One aspect of the invention is plaster articles. In one embodiment, an article having features of the invention is made up of a reaction product of a mixture that includes a particulate material and an aqueous fluid. The particulate material includes plaster. The reaction product includes plaster reacted with at least a portion of the aqueous fluid in the shape of an essentially solid prototype article including hydrated plaster. The article includes a plurality of essentially evenly distributed layers of the reaction product. In another embodiment, the particulate material includes plaster and an accelerator. In another embodiment, the particulate material includes plaster and an adhesive. In another embodiment, the particulate material includes plaster, an accelerator, and an adhesive. In another embodiment, the article includes adhesive adhered to at least portions of the hydrated plaster.

Another aspect of the invention involves methods of rapid prototyping. In one embodiment, a method of the invention involves providing a first layer of a particulate material that includes plaster, and dispensing an aqueous fluid onto the first layer. At least a portion of the plaster and at least a portion of the aqueous fluid are allowed to react to form an at least partially solid first layer. A second layer of the particulate material is provided on the at least partially solid first layer, and the aqueous fluid is dispensed onto the second layer. The plaster contained in the second layer and at least a portion of the aqueous fluid are allowed to react, to the extent that the particles within the second layer react to form an essentially solid prototype article including the at least partially solid first layer.

In another embodiment, the method involves applying, to a first portion of a first layer of particles, an aqueous fluid in an amount sufficient to react the particles with the aqueous fluid to the extent that the particles within the first portion crystallize to form an essentially solid, singular article. A second layer of the particles is formed on the first layer. An aqueous fluid is applied to a first portion of the second layer of the particles in an amount sufficient to react the particles with the aqueous fluid, to the extent that the particles within the first portion of the second layer crystallize to form an essentially solid, singular article from the first portion of the first layer and the first portion of the second layer.

These and other features, aspects and advantages of the present invention will become better understood with reference to the following description and appended claims.

BRIEF DESCRIPTION

DETAILED DESCRIPTION

Figure 1:
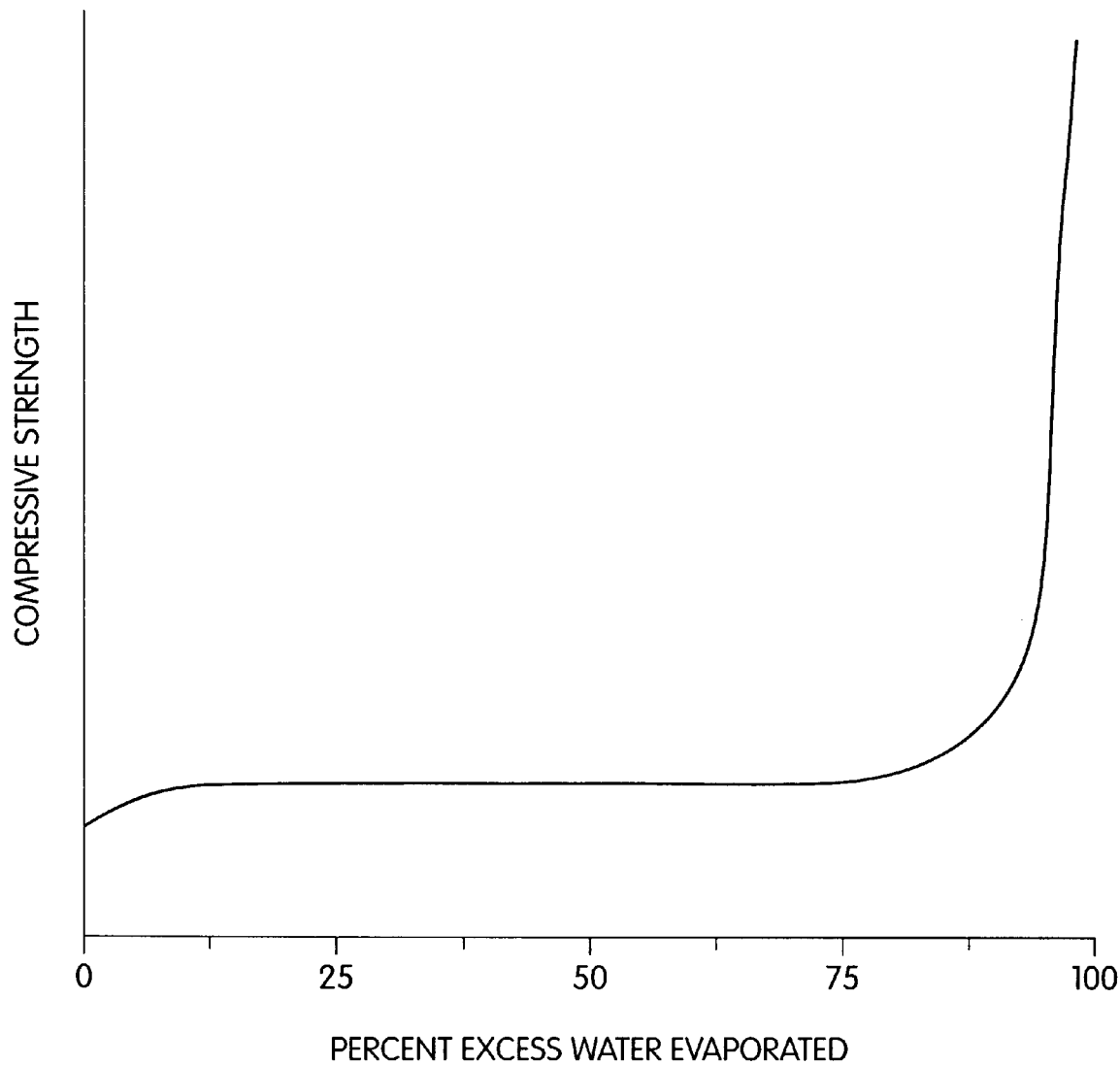
FIG. 1 is a graph of the relationship between plaster strength and water content of a plaster.

The present invention relates to a 3DP™ material system comprising a mixture of an aqueous fluid and a particulate material that includes plaster. The aqueous fluid contains water that hydrates the plaster contained in the particulate material, to form an essentially solid article. Various processing aids may be added to either the particulate material, the aqueous fluid, or both, including, but not limited to, accelerators, adhesives, flowrate enhancers, humectants, and visible dyes. The present invention also relates to a method of using such a materials system, and to an article made by the method of the invention. The material system and method of the invention may be used to manufacture both appearance models and small numbers of functional parts in an office environment, including prototype articles, but is not limited to the formation of prototype articles. "Prototype article," as used herein, is meant to define a relatively easily produced model, such as a bone, or a representation of a production part, such as a gear, bearing, shaft, etc., made of material completely different from that which the production part is made, for purposes of simplicity, speed, and economy. Rapid prototyping, generally, is known in the art.

Plaster is frequently called "Plaster of Paris," a name derived from the earths of Paris and its surrounding regions, which contain an abundance of the mineral gypsum, from which Plaster of Paris is manufactured. Plaster is also referred to by many other names, including, but not limited to, sulphate of lime, semihydrate of calcium sulfate, casting plaster, gypsum plaster, hydrated sulphate of lime, hydrated calcium sulphate, and dental plaster, as well as a variety of trade names. The term "plaster," as used herein, is meant to define any variety of material including a substantial amount of $CaSO_4 \cdot \frac{1}{2}H_2O$ that is in powder form prior to the application of an aqueous fluid. The terms "hydrated plaster" and "set plaster" are used interchangeably herein, and are meant to include any variety of plaster that includes a substantial amount of $CaSO_4 \cdot 2H_2O$ after setting, or rehydration. Many varieties of plaster are commercially available, varying, for example, in structural strength, the time required for setting, and in volume changes that occur during the setting.

Typically, commercially available plasters include other ingredients such as, but not limited to, silica, powder limestone, starch, Terra Alba, and lime. Examples of commercially available plaster materials that may be suitable for the present invention include, but are not limited to, white hydrocal cement, durabond 90, and drystone (each available from U.S. Gypsum, located in Chicago, Ill.), as well as most brands of casting plaster, molding plaster, and spackling compound.

When calcined at about 350° F., gypsum loses a substantial amount of its water of crystallization, and is thereby transformed into plaster. The dehydration, or "calcination" of gypsum, proceeds according to reaction (1) below:

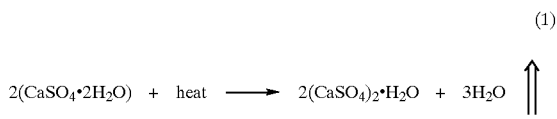
(1)

Conventional plaster processing generally involves vigorously and thoroughly mixing plaster and water to form a slurry that is saturated with water and poured into a mold to "set up," which typically takes about 30 minutes. After the plaster is mixed with the water, small quantities of the plaster crystallize and interlock together, cementing together the remaining insoluble particles. The interlocking of crystals is responsible for a great deal of the eventual physical strength of the set plaster. Conventionally, during the period in which the plaster sets up, any physical disturbance to the setting plaster should be minimized, or the plaster may not achieve its potential maximum strength, because the minute crystals of gypsum will not completely interlock. When mixed with sufficient water, plaster recovers the 1 ½ parts of water it possessed prior to calcination of the gypsum, and sets to a solid material of substantially the same composition as gypsum. When properly calcined, plaster is fairly insoluble in cold water and only slightly soluble in warm water. For example, at room temperature, about one part of plaster is soluble in about 400 parts of water. The rehydration, or re-crystallization of plaster, after it has been mixed with water, is referred to as "setting," and proceeds according to the following equation (2):

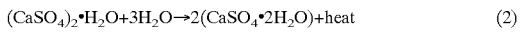
(2)

As shown in FIG. 1, the strength of a plaster-based article increases substantially after about 93% of the free moisture has been removed. Therefore, subsequent to crystallization, or setting, all of the water in excess of that required for crystallization is removed by accelerated drying or by the natural slow evaporation of the moisture to increase the strength of the final article. The time for removal of the excess water will vary with the type of plaster, the ratio of water to plaster, atmospheric moisture, temperature, and air circulation.

As described above, the material system of the present invention includes a mixture of an aqueous fluid, and a particulate material that includes plaster. For purposes of the present invention, "particulate material" is meant to define any material containing significant amounts of plaster, and which may additionally include other materials, such as, but not limited to, accelerators, adhesives, flowrate enhancers, humectants, visible dyes, fiber, and filler. Examples of these and other additives may be found in U.S. application Ser. No. 08/707,693, filed Sep. 4, 1996, which is hereby incorporated by reference in its entirety. Generally, the size of the particles in the particulate material is limited by the thickness of the layers to be printed. That is, the particles are preferably approximately smaller than the thickness of the layers to be printed. Using smaller particles may provides advantages such as smaller feature size, the ability to use thinner layers, and the ability to reduce what is known in the art as a "stair stepping" effect. In preferred embodiments, the material system includes particulate material having particles with a mean diameter ranging from about 10 μm to about 300 μm, more preferably ranging from about 10 μm to about 100 μm, and more preferably ranging from about 10 μm to about 50 μm.

One of the most important factors in determining the ultimate hardness and physical strength of the set plaster is generally considered the ratio of plaster to water. A "heavy" mix, consisting of a low proportion of water to plaster, results in a harder and heavier set plaster than that which results from a "normal" mix, in which an excess of water to plaster is used. Generally, about 20 units of water per 100 units of plaster are required for crystallization, but more water is usually added in order to achieve satisfactory pouring of the plaster/water mixture. For example, a typical plaster/water mixture suitable for pouring may include a ratio of about 60 parts of water to 100 parts of plaster, leaving an excess of about 40 parts of "free" water remaining within the plaster article after setting.

For purposes of the present invention, "aqueous fluid," as used herein, is meant to define any fluid containing sufficient water to set up the plaster contained in the particulate material, which is readily determined by those of ordinary skill in the art. In general, increasing the ratio of water to plaster increases strength of the final article. Therefore, maximizing the amount of aqueous fluid printed to the particulate material layer will generally increase the strength of the final article, but sometimes at the expense of increasing the amount and/or severity of distortions in the printed article. "Distortions," as used herein, includes, but is not limited to warping, caking, and bleeding. Consequently, the ratio of water to plaster is practically limited by several factors, including the desired speed of printing, and the acceptable amount of distortion in the final article. In theory, 100% water may be printed as the aqueous fluid —but in practice, the nozzles may clog. Therefore, it may be desirable to include various processing aids in the aqueous fluid, while maintaining a sufficient amount of water to react with the plaster. Preferably, the amount of water contained in the aqueous fluid may range from about 20% to about 100%, but is preferably in the range of about 50% to about 99%, by weight of the fluid. The ratio of aqueous fluid printed to the particulate material preferably ranges from about 5% to about 75%, and more preferably from about 30% to about 70%, by volume of the bulk particulate material, including all pore spaces.

In some instances, it may be desirable to print very small features. The size of features that may be printed is determined, in part, by the size of the droplets dispensed from the nozzle. In general, smaller nozzles produce smaller droplets and smaller printed features. However, smaller nozzles reduce the printing speed, as the volume of water printed on the layer of particulate material decreases, and clogging may occur as well. Occurrences of nozzle clogging may be avoided by using larger nozzles, which dispense larger droplets. Again, the size of the nozzle and droplets may be practically limited by the acceptable amount of distortion in the final article. Preferably, the individual droplets of aqueous fluid have a volume ranging from about 30 pl to about 200 pl. Two commercially available print heads provide droplet sizes ranging from about 70 pl to about 90 pl, and from about 110 pl to about 130 pl. Typically, the material system and method of the present invention are capable of producing features on the order of about 75–125 µm, but smaller or larger features may be achieved by changing the droplet size.

Once the aqueous fluid is printed onto the particulate material layer, a process which is described in more detail below, the water contained in the aqueous fluid immediately begins to evaporate and to diffuse away from the location where it was printed. Maximizing the amount of aqueous fluid printed to the layers ensures that sufficient water for the rehydration of the plaster may be drawn from the fluid before it evaporates or migrates, and also because the fluid acts as a vehicle in which the reaction may take place. The aqueous fluid is capable of bonding together the particulate material in an amount that is several times the mass of a droplet of the fluid. The amount by which the individual droplets expand or migrate into the particulate material depends on many factors, including the rate at which the water and the plaster react, and may also be affected by the addition of additives to either the particulate material and/or the aqueous fluid.

In other embodiments, either the particulate material, the aqueous fluid, or both, may include one or more processing aids. For example, in the present invention, it is essential that the plaster set as quickly as possible. Therefore, to facilitate quick setting, accelerators are frequently used. "Accelerator," as used herein, is meant to define any material that increases the rate at which plaster sets. Examples of ways to accelerate the rate of plaster include, but are not limited to, increasing the solubility of plaster in water, or by providing additional nucleation sites for crystal formation. Accelerators are generally used sparingly in conventional plaster processing, as they may adversely affect the strength characteristics of the plaster. However, accelerators are preferred in the present invention due to the importance of having the plaster set quickly. Suitable accelerators include, but are not limited to, Terra Alba, potassium sulfate, sodium chloride, under calcined plaster, alum or potassium alum, lime, and calcined lime. Terra Alba, which is raw ground gypsum, is a preferred accelerator, and works by providing additional nucleation sites for gypsum crystal formation. Another preferred accelerator is potassium sulfate, which is thought to work by increasing the solubility of the plaster in the water. Both Terra Alba and potassium sulfate also increase the final strength of the article. In one embodiment, at least one accelerator is preferably added to the particulate material or to the aqueous fluid in order to increase the rate at which the plaster sets. In another embodiment, at least one accelerator is preferably added to both the particulate material and to the aqueous fluid in order to increase the rate at which the plaster sets. In general, the ratio of accelerator to particulate material is dependent on the type of plaster being used. In preferred embodiments, when an accelerator is added to the particulate material, it is preferably an amount of less than about 5%, more preferably less than about 3%, and more preferably less than about 2%, by weight of the particulate material. When an accelerator is added to the aqueous fluid, it is preferably added in an amount of less than about 5%, more preferably less than about 3%, and more preferably less than about 2%, by weight of the aqueous fluid. When an accelerator is added to both the particulate material and the aqueous fluid, it is preferably in the same proportions discussed previously.

Since it is important in the present invention that the plaster set as quickly as possible, the addition of retardants should be avoided. Slowing down the rate at which the plaster sets may allow too much of the aqueous fluid to migrate away, or the water to vaporize, before sufficient plaster and water have reacted. Examples of such retardants include, but are not limited to, borax, marshmallow root, alcohol, calcined lime, sugar, sorghum, potassium acid tartrate, powdered horn, hair, various organic substances, and citric or acetic acid.

In other embodiments, the particulate material, the aqueous fluid, or both, may include an adhesive or a combination of adhesives. The adhesive and plaster synergistically interact to form parts that are stronger than either of the individual materials. One embodiment includes at least one adhesive added to the particulate material or to the aqueous fluid in order to improve the strength and toughness of the final article. In another embodiment, at least one adhesive is added to both the particulate material and to the aqueous fluid. As used herein, "adhesive" is meant to define a material that is at least slightly soluble in, and preferably substantially soluble in, or activated by, any component of the aqueous fluid, or by heat, and that forms secondary bonds between the particles of material that were at least partially separate before dissolution or activation. It should be understood that the primary bonds between the particles of material that were separate before the addition of the aqueous fluid are the interlocking gypsum crystals, which also provide the bulk of the strength to the final article. The choice of the specific type, grade, and particle size of the adhesive is important, as the adhesive contributes to the quality and strength of the final article. Those of ordinary skill in the art may select suitable adhesives through routine experimentation. Particulate adhesives may be screened or comminuted to the desired size, which is typically less than about 170 mesh, and preferably less than about 175 mesh.

Preferably, the adhesive, or combination of adhesives, is at least partially water soluble, and more preferably substantially water soluble. It appears that there is a synergistic relationship in the techniques of the invention between the plaster and a water soluble adhesive, by which the setting plaster draws water from the adhesive solution, causing the adhesive to set more rapidly. As the aqueous fluid dissolves, partially dissolves, activates, or reacts with the adhesive, the viscosity of the aqueous fluid increases dramatically, arresting further migration of the aqueous fluid from the initial point of impact. Within a few minutes, the aqueous fluid with adhesive dissolved therein infiltrates the only slightly soluble plaster particles and/or crystallized gypsum crystals, forming adhesive bonds therebetween.

As stated previously, an adhesive, or adhesives, may be added to the particulate material and/or the aqueous fluid. In the present embodiment, the adhesive is preferably a water soluble resin, such as, but not limited to, polyvinyl alcohol, (PVA), polyvinyl pyrrolidone (PVP), or dextrin. In addition to adding strength to the final article, the addition of a water soluble adhesive resin may also reduce distortion in comparison to parts bound together solely by water, or by a water soluble adhesive. When any of the previously described adhesives are added to the particulate material, the amount of adhesive in the particulate material is dependent on the type of adhesive and plaster used, and may be determined by routine experimentation. In the embodiment where an adhesive or combination of adhesives is added to the particulate material, it is preferably added in an amount of less than about 50%, and more preferably in an amount of about 20% to about 40%, by weight of the particulate material. When an adhesive or combination of adhesives is added to the aqueous fluid, it is preferably added in a ratio of about 10%, by weight of the fluid.

Figure 2:
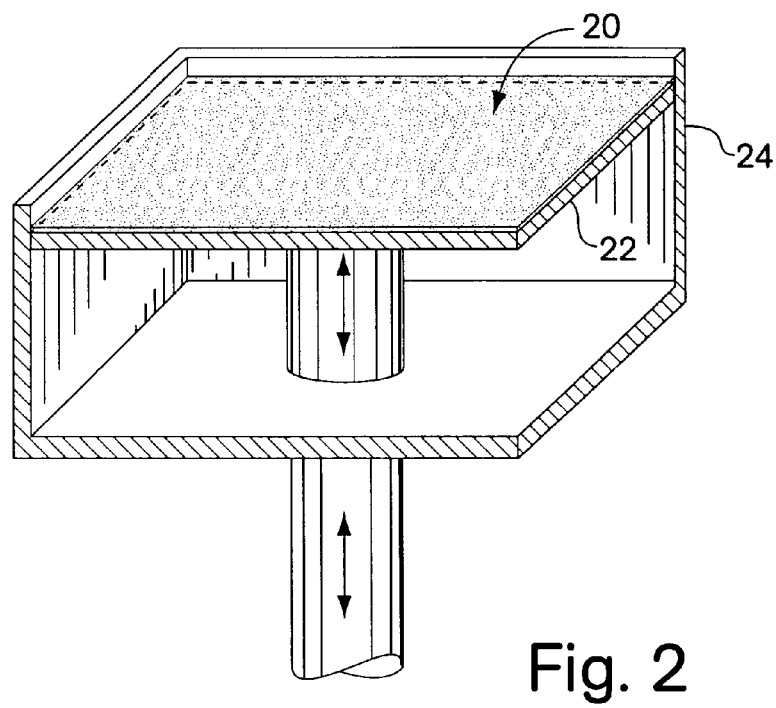
FIG. 2 illustrates schematically a first layer of a mixture of particulate material of the invention deposited onto a downwardly movable surface on which an article is to be built, before any fluid has been delivered.
Figure 3:
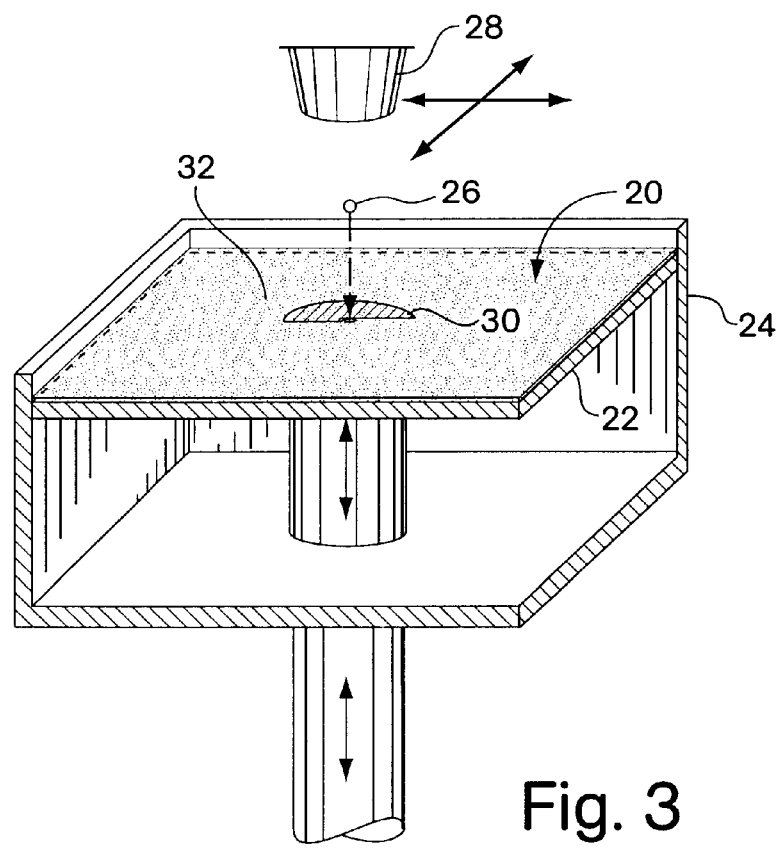
FIG. 3 illustrates schematically an ink-jet nozzle delivering an activating fluid to a portion of the layer of particulate material of FIG. 2 in a predetermined pattern.

Referring now to FIGS. 2 and 3, a schematic representation of a printing method using the materials system of the present invention is presented. According to the method, a layer of particulate material 20 is applied on a downwardly movable surface 22 of a container 24. The layer of particulate material 20 may be formed in any manner, and preferably is applied using a counter-roller, which minimizes disruption of any previously applied layers. The thickness of an individual layer used to build the prototype articles of the present invention preferably range from about 12 $\mu$m to about 125 $\mu$m, more preferably from about 50 $\mu$m to about 125 $\mu$m, and more preferably still from about 50 $\mu$m to about 75 $\mu$m. In theory, there is no limit on the thickness of the layers of particulate material other than the capability of the equipment being used. In practice, the layers of particulate material are typically limited by the amount of aqueous fluid that may be delivered to the layer, as described below.

FIG. 3 is a schematic representation of an ink-jet nozzle 28 delivering a plurality of droplets of an aqueous fluid 26 to a portion 30 of the layer 20 of the particulate material in a two-dimensional pattern. According to the method, the aqueous fluid 26 is delivered, or printed, to the layer of particulate material in any predetermined two-dimensional pattern (circular, in the figures, for purposes of illustration only), using any convenient mechanism, such as a Drop-On-Demand (hereinafter "DOD") printhead driven by customized software which receives data from a computer-assisted-design (hereinafter "CAD") system, a process which is known in the art. In the first portion 30 of the particulate material layer, a reaction is initiated between the plaster contained in the particulate material layer and the water contained in the aqueous fluid, causing the plaster to rehydrate. The reaction product of the aqueous fluid and particulate material forms an essentially solid circular layer that becomes a cross-sectional portion of the final article.

Any undissolved or unreacted particulate material 32 that was not exposed to the aqueous fluid remains loose and free-flowing on the movable surface. Preferably, the undissolved or unreacted particulate material is left in place until formation of the final article is complete. Leaving the loose particulate material in place ensures that the article is supported during processing, allowing features such as overhangs, undercuts, and cavities (not illustrated, but conventional) to be defined without using support structures. After formation of the first cross-sectional portion of the final article, the movable surface is indexed downward.

Using, for example, a counter-rolling mechanism, a second layer of particulate material is then applied over the first, covering both the rigid first cross-sectional portion 30, and any loose particulate material by which it is surrounded. A second application of aqueous fluid follows in the manner described above, which reacts with the plaster in the newly printed layer and with the plaster in a portion of the previous cross-sectional portion, as well as hardening to form a second rigid cross-sectional portion added to the first rigid cross-sectional portion of the final article. The movable surface is again indexed downward.

Figure 4:
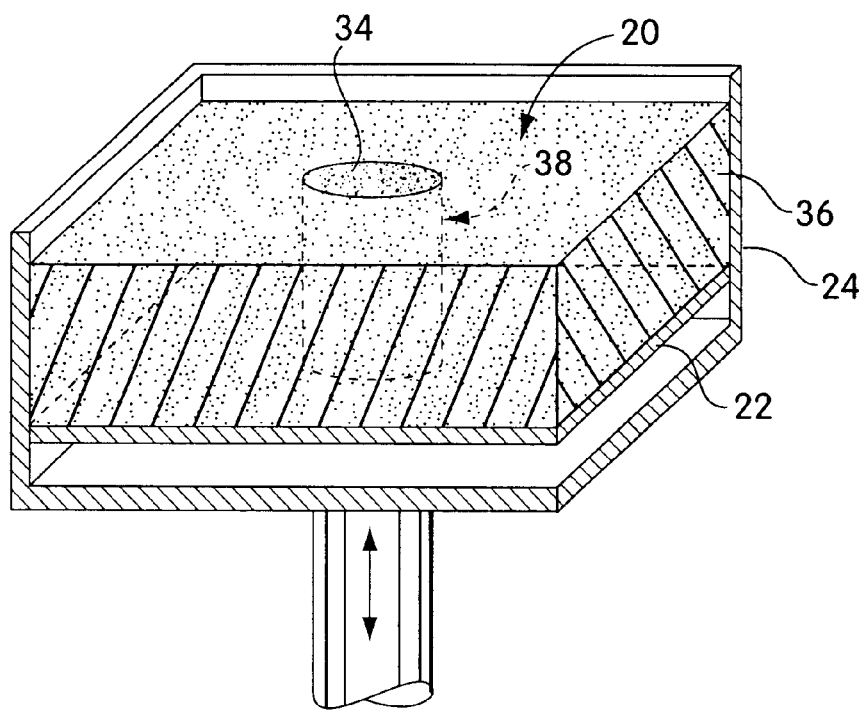
FIG. 4 illustrates schematically a view of a final article made from a series of steps illustrated in FIG. 3 enclosed in the container while it is still immersed in the loose unactivated particles.

The previous steps of applying a layer of particulate material, applying the aqueous fluid, and indexing the movable surface downward are repeated until the final article is completed. Alternatively, those skilled in this art would know how to build an article in layers upward from an immovable platform, by successively depositing, smoothing and printing a series of such layers. FIG. 4 is a schematic representation of a final cylindrical article after it has been completely formed. At the end of the process, only the top surface 34 of a final article 38 is visible in the container. The final article is preferably completely immersed in a bed 36 of undissolved and unreacted particulate material, and is made up of a plurality of essentially evenly distributed layers.

Figure 5:
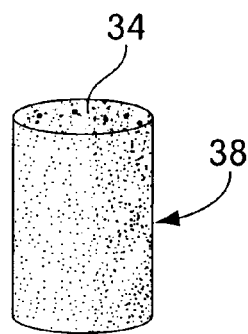
FIG. 5 illustrates schematically a view of the final article from FIG. 4.

FIG. 5 is a schematic representation of the final cylindrical article 38 after removal of undissolved and unreacted particulate material, preferably by blown air or a vacuum. After removal of the undissolved and unreacted particulate material from the final article 38, post-processing treatment may be performed, including cleaning, infiltration with stabilizing materials, painting, etc.

After the final article has been formed, any additional water, or free moisture, must be removed to increase the strength of the printed article. As stated previously, the strength of plaster will increase only slightly until about 93% of the free moisture has been removed, after which the strength increases sharply. Although not required, excess moisture may be removed from the final article by drying at a temperature of at least about 125° F., generally up to a limit of around 350° F. If an adhesive is incorporated into the article, higher drying temperatures may be used, which is dependent on the adhesive used. In general, when an adhesive is used, the flexural strength of the final article increases with the amount of time it is subject to heat.

After the final article has set, and all loose surrounding powder has been removed, the article may be infiltrated with a variety of materials to improve the hardness, strength, or toughness. These finishes may fill in any pores in the part, improving the surface finish, and making it more impervious to water or solvents. Suitable hardeners include, but are not limited to, molten wax, varnish, lacquer, cyanoacrylate, polyurethane, and epoxy.

A final article formed using the material system and methods of the present invention will include a plurality of evenly distributed layers of the reaction product of the particulate material and the aqueous fluid. The reaction product of the particulate material and the aqueous fluid preferably includes a substantial amount of hydrated plaster, which may vary depending on the particulate material used. In preferred embodiments, the reaction product may include an accelerator, an adhesive, or both. When the reaction product includes an adhesive, the adhesive particles may adhere to at least a portion of the particles contained in the particulate material. As described above with reference to the method of the invention, the reaction product layers preferably each have a thickness in the range of less than about 125 $\mu$m, more preferably about 12 $\mu$m to about 125 $\mu$m, more preferably about 50 $\mu$m to about 125 $\mu$m, and more preferably still about 50 $\mu$m to about 75 $\mu$m. For layers having a thickness of less than about 125 $\mu$m, the uniformity of the layer typically varies less than about 0.001". The flexural strength of the article of the invention is dependent on, inter alia, the composition of both the particulate material and the aqueous fluid, the ratio of water to plaster, and the amount of additives, if any. In practice, the strength of the articles is limited only by the minimum strength required in order to handle the article without breaking. The preferred flexural strength of the final articles is dependent on the type of article that is formed, but is typically at least about 1 MPa, more preferably at least about 5 MPa, and more preferably at least about 10 MPa. Flexural strength of less than 1 MPa may be sufficient for some applications.

Choosing a plaster suitable for the particulate material of the present invention involves various qualitative evaluations, which may easily be accomplished through routine experimentation by those of ordinary skill in the art. First, a small mound of plaster is formed, a small depression is formed in the mound, and a small amount of water is placed in the depression. Visual observations are made regarding, inter alia, the rate at which the water diffuses into the plaster, the viscosity of the plaster after mixing with water, and whether a membrane is formed around the water. Next, a syringe filled with water is used to strafe the mounds of plaster. After a period of about 24 hours, the mounds of plaster are examined. Those from which all of the water has evaporated are not suitable, as the plaster did not react quickly enough with the water to prevent the water from evaporating or diffusing into the surrounding dry powder. Those in which pebbles of hydrated plaster have formed are more suitable, as it means that the plaster and water react more quickly than the water can evaporate or diffuse into the surrounding dry powder. Those in which both pebbles and rods of hydrated plaster have formed are the most suitable, indicating that the rate at which the water and plaster react is greater than the rate at which water evaporates or diffuses into the surrounding dry powder. In some instances, the rods of hydrated plaster will shrink, indicating that the plaster may give rise to problems with distortions. As described above, various additives may be included in the particulate material and/or aqueous fluid to accelerate the rate at which the plaster sets.

The plaster may also be evaluated to determine the ease of spreading. Simple test parts may also be formed to determine, inter alia, the flexural strength, the distortion, the rate of setting, the optimum layer thickness, and the optimum ratio of water to plaster (or aqueous fluid to particulate material).

Material systems suitable for use in the 3DP™ method include those having reaction products with minimal distortion, in addition to relatively high flexural strength. That is, reaction products with high flexural strength values may not be suitable for use in the 3DP™ method, because distortions may compromise the accuracy of the final printed articles, which is especially applicable where relatively fine features are desired.

EXAMPLES

A type of test part that may be formed and used to evaluate the flexural strength of a material system for screening purposes is referred to as a "break bar." Break bars used herein were formed by spreading successive layers of particulate material to which successive applications of an aqueous fluid were made, until the fluid permeated several of the layers. The break bars were then allowed to set. These bars were sawed into 0.2" strips. The flexural strength of the material was determined, in megapascals (MPa), by breaking the bar with a testing device. The qualitative assessment of a material system also involves visually inspecting the parts for distortion.

Examples 1–3

Several materials were screened as described above, and used to form break bars. The results of the break bar tests are shown below in Table 1. Four different types of plaster or particulate material were used. The aqueous fluid used in the first example included about 95% water and about 5% of a humectant, glycerol. An accelerator was added to the aqueous fluid used in the example, which included about 92% water, about 5% glycerol, and about 3% of the accelerator, potassium sulfate. In most instances, the addition of an aqueous fluid improved the flexural strength of the materials, as illustrated by a comparison of the flexural strength measurements from the first and second examples.

TABLE 1

|  | U.S. Gypsum White Hydrocal Cement | U.S. Gypsum Durabond 90 | Kerr Velmix Diestone | U.S. Gypsum Drystone |
|---|---|---|---|---|
| Example 1 | 0 | 0.58 | 0.21 | 0.41 |
| Example 2 | 1.14 | 0.96 | 0.63 | 0.35 |
| Example 3 | 2.38 | | | |

The aqueous fluid used in the third example was the same as that used in the second example. An accelerator, Terra Alba, was added to the set plaster having the highest flexural strength from the first and second examples. The addition of an accelerator to the plaster approximately doubled the flexural strength, as shown above in Table 1.

Examples 4–6

The following experiments show the formation of parts by aqueous fluid activation of the particulate material of the present invention, and the results of adding various accelerators and/or adhesives, as well as other processing aids, to either the particulate material or to the aqueous fluid. Example 4 illustrates the effect of adding an accelerator to the material system of the present invention. Examples 5 and 6 illustrate the effect of adding an adhesive to the material system of the present invention.

In Examples 4–6, break bars were formed by spreading successive layers of particulate material, to which successive applications of an aqueous fluid were made, until the thickness of the part reached about 6 mm. The break bar was allowed to set, and the flexural strength of the material was determined, in megapascals (MPa), by breaking the bar with a testing device. The warpage was also determined by measuring the amount of "arching" per two (2) inches of the break bar.

A second test part, used to determine the definition of the particulate material, is referred to as "depowdering" bar, and was printed to a thickness of about 6 mm in the same manner as the break bar. The depowdering bar used in these experiments included 19 holes with varying diameters. When the printing of the depowdering bar part was complete, unbound powder remained in the holes. A jet of compressed air was then used to blow the unbound powder from the holes. The more holes that could be cleared of powder, the more acceptable the definition of the particulate material.

Example 4

One kilogram of particulate material was prepared using the materials and ratios shown below in Table 2. The adhesives were sieved through a 170 mesh screen into a bucket, prior to mixing together by hand with the plaster and accelerator. After hand mixing with the plaster and accelerator, the mixture was placed in a Waring Model 34BL22 Commercial Blender with a two (2) gallon mixing vessel and blended on "high" for about 30 seconds. The resulting blended mixture was then sieved through a 50 mesh screen to remove clumps.

TABLE 2

| Ingredient | Percent | Material/Trade Name | Vendor |
|---|---|---|---|
| Plaster | 79.2 | White Hydrocal Cement | U.S. Gypsum |
| Accelerator | 20.0 | Dextrin | Staley/Star-dri5 |
| Accelerator | 0.8 | Terra Alba | U.S. Gypsum |

About 2 liters of the aqueous fluid were prepared using the amounts shown in Table 3 below.

TABLE 3

| Ingredient | Percent | Material/Trade Name | Vendor/Grade |
|---|---|---|---|
| Water | 86.2 | Distilled | Poland Spring |
| Humectant | 6.0 | Glycerol | Aldrich |
| Flow Rate Enhancer | 5.0 | PVP | Aldrich |
| Accelerator | 2.0 | Potassium Sulfate | Aldrich |
| Enhances Solubility of PVP | 0.5 | Isopropyl Alcohol | Osco Drug |
| Flow Rate Enhancer | 0.3 | Ethyl Butyrate | Aldrich |

A break bar and two (2) depowdering bars, were formed from the particulate mixture and an aqueous fluid. The break bar strength was about 18.5 MPa. The break bar had a warping distortion of 0.001", and the edges were curled. The depowdering bars were printed with layers having a thickness of about 3 mil, at a ratio of about 47% aqueous fluid to powder, by volume. Loose powder was removed from 10/19 and 11/19 holes in each of the two depowdering bars.

The results shows the synergistic effect on the break bar strength of the addition of an accelerator and an adhesive to both the particulate material and the aqueous fluid. However, the material system was not optimal due to the distortion after printing.

Example 5

One kilogram of particulate material was prepared using the components and ratios shown in Table 4 below. Adhesives were sieved through a 170 mesh screen into a bucket, prior to mixing together by hand with the plaster and accelerator. After hand mixing with the plaster and accelerator, the mixture was placed in a Waring Model 34BL22 Commercial Blender with a two (2) gallon mix.

TABLE 4

| Ingredient | Percent | Material/Trade Name | Vendor/Grade |
|---|---|---|---|
| Plaster | 62.4 | White Hydrocal Cement | U.S. Gypsum |
| Adhesive | 30.0 | PVA | Air Products/Airvol 203s |
| Adhesive | 7.0 | Dextrin | Staley/Star-dri5 |
| Accelerator | 0.6 | Terra Alba | U.S. Gypsum |

About 2 liters of the aqueous fluid was prepared using the amounts shown in Table 5 below. The flowrate enhancer and humectant were added to a clean jug, followed by the distilled water, and the jug was capped and shaken until the ingredients were dissolved.

TABLE 5

| Ingredient | Percent | Material/Trade Name | Vendor/Grade |
|---|---|---|---|
| Water | 86.5 | Distilled | Poland Spring |
| Humectant | 6.0 | Glycerol | Aldrich |
| Flowrate Enhancer | 5.0 | PVP | Aldrich |
| Accelerator | 2.0 | Potassium Sulfate | Aldrich |
| Enhances solubility of PVP | 0.5 | Isopropyl Alcohol | Osco Drug |

A break bar and two (2) depowdering bars were formed from the particulate mixture and the aqueous fluid, as described above. The break bar strength was about 12 MPa, with no measurable distortion. The depowdering bars were printed with layers having a thickness of about 3 mil, and a ratio of about 56% aqueous fluid to particulate material. Loose powder was removed from 11/19 and 13/19 holes in each of the two depowdering bars.

The results of Example 5 again show the synergistic effect on the break bar strength of the addition of an accelerator and an adhesive to both the particulate material and the aqueous fluid. However, the material system was not optimal due to the distortion after printing.

Example 6

One kilogram of particulate material was prepared using the amounts shown in Table 6 below. The adhesives were sieved through a 170 mesh screen into a bucket, prior to mixing together by hand with the plaster and accelerator. After hand mixing with the plaster and accelerator, the mixture was placed in a Waring Model 34BL22 Commercial Blender with a two (2) gallon mixing vessel and blended on "high" for about 30 seconds. The resulting blended mixture was then sieved through a 50 mesh screen to remove clumps, hair, dirt, etc.

TABLE 6

| Ingredient | Percent | Material/Trade Name | Vendor/Grade |
|---|---|---|---|
| Plaster | 79.2 | White Hydrocal Cement | U.S. Gypsum |
| Adhesive | 17.5 | Dextrin | Staley/Star-dri5 |
| Adhesive | 2.5 | Cellulose Gel | FMC Avicel RCN-30 |
| Accelerator | 0.8 | Terra Alba | U.S. Gypsum |

About 2 liters of the aqueous fluid was prepared using the amounts shown in Table 7 below. An accelerator, two (2) flowrate enhancers, a humectant, and a substance to increase the solubility of the flow rate enhancers were added to a clean jug, followed by distilled water, and the jug was capped and shaken until the ingredients were dissolved.

TABLE 7

| Ingredient | Percent | Material/Trade Name | Vendor/Grade |
|---|---|---|---|
| Water | 86.2 | Distilled | Poland Spring |
| Humectant | 6.0 | Glycerol | Aldrich |
| Flow Rate Enhancer | 5.0 | PVP | Aldrich |
| Accelerator | 2.0 | Potassium Sulfate | Aldrich |
| Enhances Solubility of PVP | 0.5 | Isopropyl Alcohol | Osco Drug |

TABLE 7-continued

| Ingredient | Percent | Material/Trade Name | Vendor/Grade |
|---|---|---|---|
| Flow Rate Enhancer | 0.3 | Ethyl Butyrate | Aldrich |

A break bar and two (2) depowdering bars were formed from the particulate mixture and the aqueous fluid, as described above. The break bar strength was about 8.5 MPa, with a distortion of about 2 mils. The depowdering bars were printed with layers having a thickness of about 3 mil, and a ratio of about 49% aqueous fluid to particulate material. Loose powder was removed from 8/19 and 7/19 holes in each of the two depowdering bars.

Example 7–8

In Examples 7–8, prototype jewelry articles were formed using the same material systems used in Examples 5 and 6. The process for printed the prototype articles is detailed below.

Example 7

Using the same particulate material and aqueous fluid used in Example 5, above, an article was printed using a Z402 3D printer (beta version). An *.stl file containing the "build" information for a prototype piece of jewelry was imported into the software interface of the system. The Z402 3DP printer was filled with the particulate material used in Experiment 4. The "print" button was clicked on the software, and the build process commenced. A single layer of particulate material having a thickness of about 3 mils was applied onto the movable bottom of the build box. The aqueous fluid used in Experiment 4, having droplet sizes ranging from about 70 pl to about 90 pl, was printed onto the layer of particulate material to form the shape of the cross-section of the prototype jewelry article. The bottom of the build box was lowered by one (1) layer thickness and a new layer of powder was spread. The process was repeated for successive cross-sections of the prototype article. Upon completion, the build box was filled with powder, some of which formed the prototype article, and some of which was loose. When the build was finished, the excess powder was vacuumed away and the article was lifted from the bed for viewing.

Example 8

Using the same particulate material and aqueous fluid used in Example 6 above, a jewelry article was printed using a C2000 3DP printer. An *.stl file containing the "build" information for a prototype piece of jewelry was imported into the software interface of the system. The C2000 3DP printer was filled with the particulate material used in Experiment 2. The "print" button was clicked on the software, and the build process commenced. A single layer of particulate material having a thickness of about 3 mils was applied onto the movable bottom of the build box. The aqueous fluid used in Experiment 5, having droplet sizes ranging from about 110 pl to about 130 pl was printed onto the layer of particulate material to form the shape of the cross-section of the prototype jewelry article. The bottom of the build box was lowered by one (1) layer thickness and a new layer of powder was spread. The process was repeated for successive cross-sections of the prototype article. Upon completion, the build box was filled with powder, some of which formed the prototype article, and some of which was loose. When the build was finished, the excess powder was vacuumed away and the prototype article was lifted from the bed for viewing. The article was sanded and infiltrated with ZR10 cyanoacrylate resin and cured for about 30 minutes to produce a harder finish than that of the test parts of Experiment 5.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention can be practiced otherwise than as specifically described.

What is claimed is:

1. A product of a reaction of a mixture comprising:
 a particulate material including plaster;
 an aqueous fluid;
 an at least partially water-soluble adhesive; and
 an accelerator;
 wherein only a portion of said plaster is reacted with at least a portion of said aqueous fluid to form an essentially solid prototype article including hydrated plaster;
 said article including a plurality of essentially evenly distributed layers of said reaction product.

2. The product claim 1, wherein said mixture includes from about 5% to about 75% of said aqueous fluid, by volume of said mixture.

3. The product claim 1, wherein said mixture includes from about 30% to about 70% of said aqueous fluid, by volume of said mixture.

4. The product of claim 1, wherein said mixture includes less than about 5 percent of said accelerator, by weight of said aqueous fluid.

5. The product of claim 1, wherein said mixture includes less than about 10% of said adhesive, by weight of said aqueous fluid.

6. The product of claim 5, wherein said aqueous fluid includes from about 20% to about 100% of water, by weight of said aqueous fluid.

7. The product of claim 5, wherein said aqueous fluid includes from about 50% to about 99% of water, by weight of said aqueous fluid.

8. The product of claim 1, wherein said mixture includes less than about 5% of said accelerator, by weight of said particulate material.

9. The product of claim 1, wherein said mixture includes less than about 3% of said accelerator, by weight of said particulate material.

10. The product of claim 1, wherein said mixture includes less than about 2% of said accelerator, by weight of said particulate material.

11. The product of claim 1, wherein the thickness of each of said layers is less than about 300 $\mu$m.

12. The product of claim 1, wherein the thickness of each of said layers ranges from about 12 $\mu$m to about 125 $\mu$m.

13. The product of claim 1, wherein the thickness of each of said layers ranges from about 50 $\mu$m to about 75 $\mu$m.

14. The product of claim 1, wherein the thickness of each of said layers ranges from about 50 $\mu$m to about 75 $\mu$m.

15. The product of claim 1, comprising a flexural strength of at least 1 MPa.

16. The product of claim 1, comprising a flexural strength of at least 5 MPa.

17. A method for forming a prototype article, comprising:

providing a first layer of a particulate material including plaster;

dispensing an aqueous fluid onto a first portion of said first layer, leaving a second portion of said first layer free of said aqueous fluid, said first layer further comprising an at least partially water-soluble adhesive and an accelerator;

allowing said first portion of said plaster and at least a portion of said aqueous fluid to react to form an at least partially solid first portion of said first layer;

providing a second layer of said particulate material on said first layer;

dispensing said aqueous fluid onto a first portion of said second layer, leaving a second portion of said second layer free of said aqueous fluid, said second layer further comprising an at least partially water-soluble adhesive and an accelerator;

allowing the plaster contained in said first portion of said second layer and at least a portion of said aqueous fluid to react to form at least a portion of an essentially solid prototype article including the at least partially solid first portion of said first layer; and removing unbonded particulate material of the second portion surrounding the prototype article.

18. The method of claim 17, further comprising providing said aqueous fluid in a range of about 2% to about 75%, by volume of the particulate material.

19. The method of claim 17, further comprising removing an excess of said aqueous fluid from said article.

20. The method of claim 19, wherein said particulate material is provided with said accelerator.

21. The method of claim 20, wherein said particulate material is provided with said adhesive.

22. The method of claim 21, wherein said aqueous fluid is provided with said accelerator.

23. The method of claim 22, wherein said aqueous fluid is provided with said adhesive.

24. The method of claim 17, further comprising forming said first and said second layers at a thickness of less than about 125 μm.

25. A prototype article formed by the method of claim 17.

26. A method for forming a prototype article, comprising:

applying, to a first portion of a first layer of particles including plaster, a partially water-soluble adhesive, and an accelerator, an aqueous fluid in an amount sufficient to react the particles with the aqueous fluid such that adsorption by the plaster of a portion of the aqueous fluid allows solidification of the water-soluble adhesive in the first portion such that at least a portion of said first portion of said first layer of particles crystallize to form an essentially solid, singular article;

forming a second layer of the particles on the first layer;

applying to a first portion of said second layer of particles including plaster, a partially water-soluble adhesive, and an accelerator, said aqueous fluid in an amount sufficient to react said particles, with said aqueous fluid such that absorption by the plaster of a portion of the aqueous fluid allows solidification of the water soluble adhesive in the first portion such that said particles within said first portion of said second layer crystallize to form at least a portion of an essentially solid, singular prototype article from said first portion of said first layer and said first portion of said second layer; and removing unbonded particulate material of a second portion surrounding the article.

27. The method of claim 26, further comprising forming said first and said second layers by evenly distributing said particles to form a layer having a thickness of less than about 125 μm.

28. The method of claim 27, further comprising forming said first and said second layers by evenly distributing said particles to a thickness in the range of about 12 μm to about 125 μm.

29. The method of claim 27, further comprising forming said first and said second layers by evenly distributing said particles to a thickness in the range of about 50 μm to about 125 μm.

30. The method of claim 27, further comprising forming said first and said second layers by evenly distributing said particles to a thickness in the range of about 50 μm to about 75 μm.

* * * * *